United States Patent

Wright

[11] 4,098,149
[45] Jul. 4, 1978

[54] GRINDING MACHINE

[76] Inventor: James L. Wright, 81085 N. Beach Rd., Creswell, Oreg. 97426

[21] Appl. No.: 740,835

[22] Filed: Nov. 11, 1976

[51] Int. Cl.² .................................................. B23D 63/14
[52] U.S. Cl. ....................................... 76/40; 51/56 R; 51/225
[58] Field of Search ............... 76/37, 40, 48; 51/33 R, 51/80 R, 225, 56 R

[56] References Cited

U.S. PATENT DOCUMENTS

| 1,051,153 | 1/1913 | Nelson | 76/48 |
| 2,722,087 | 11/1955 | Hamilton | 51/32 |
| 3,053,017 | 9/1962 | Rosenthal | 51/33 R |
| 3,304,660 | 2/1967 | Bindszus | 51/225 |
| 3,304,810 | 2/1967 | English | 76/40 |
| 3,406,486 | 10/1968 | Bettcher | 51/225 |
| 3,610,098 | 10/1971 | Walker | 51/80 R |

FOREIGN PATENT DOCUMENTS

| 226,566 | 8/1962 | Austria | 51/33 R |

Primary Examiner—Harold D. Whitehead
Assistant Examiner—Roscoe V. Parker
Attorney, Agent, or Firm—Kolisch, Hartwell, Dickinson & Stuart

[57] ABSTRACT

A dual side saw tooth grinding machine with power-driven grinding wheel assemblies mounted on pivoted supporting arms organized so that edge portions of grinding wheels in the assemblies are moved in sweeps across opposite sides of a tip in a saw tooth when grinding the same.

12 Claims, 8 Drawing Figures

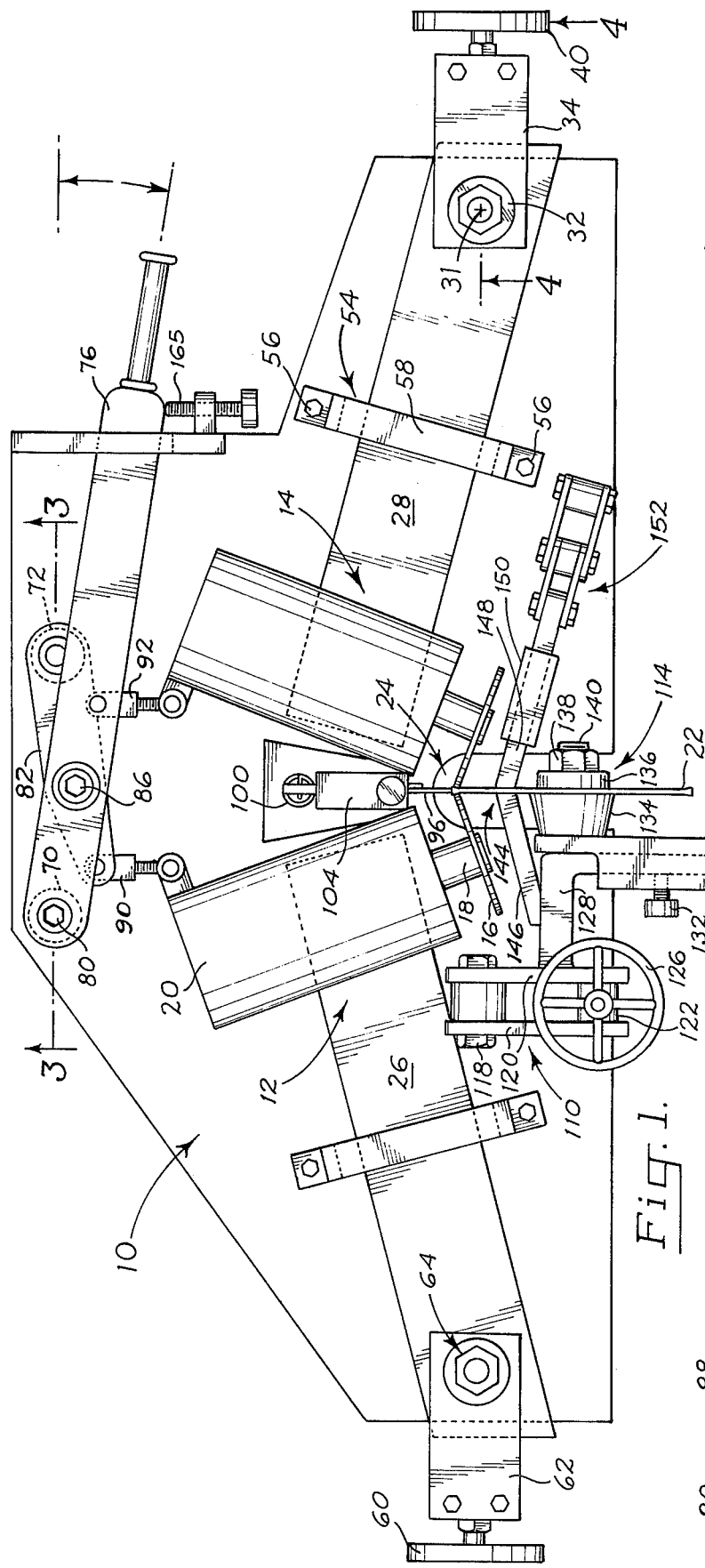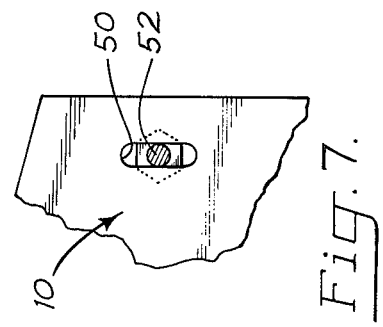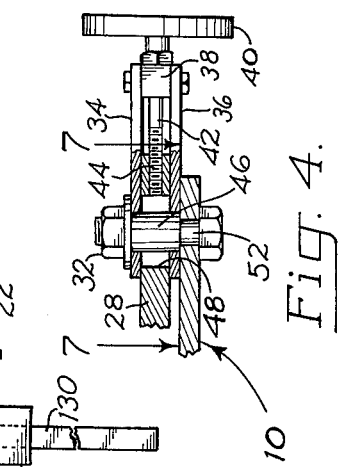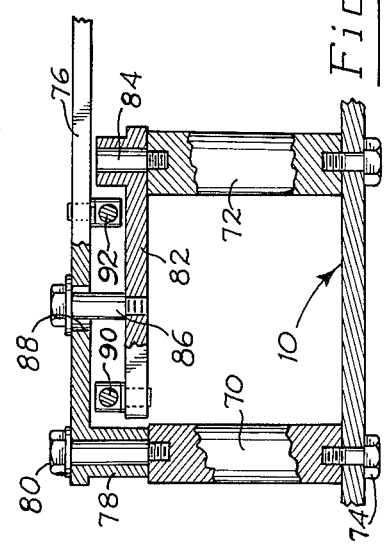

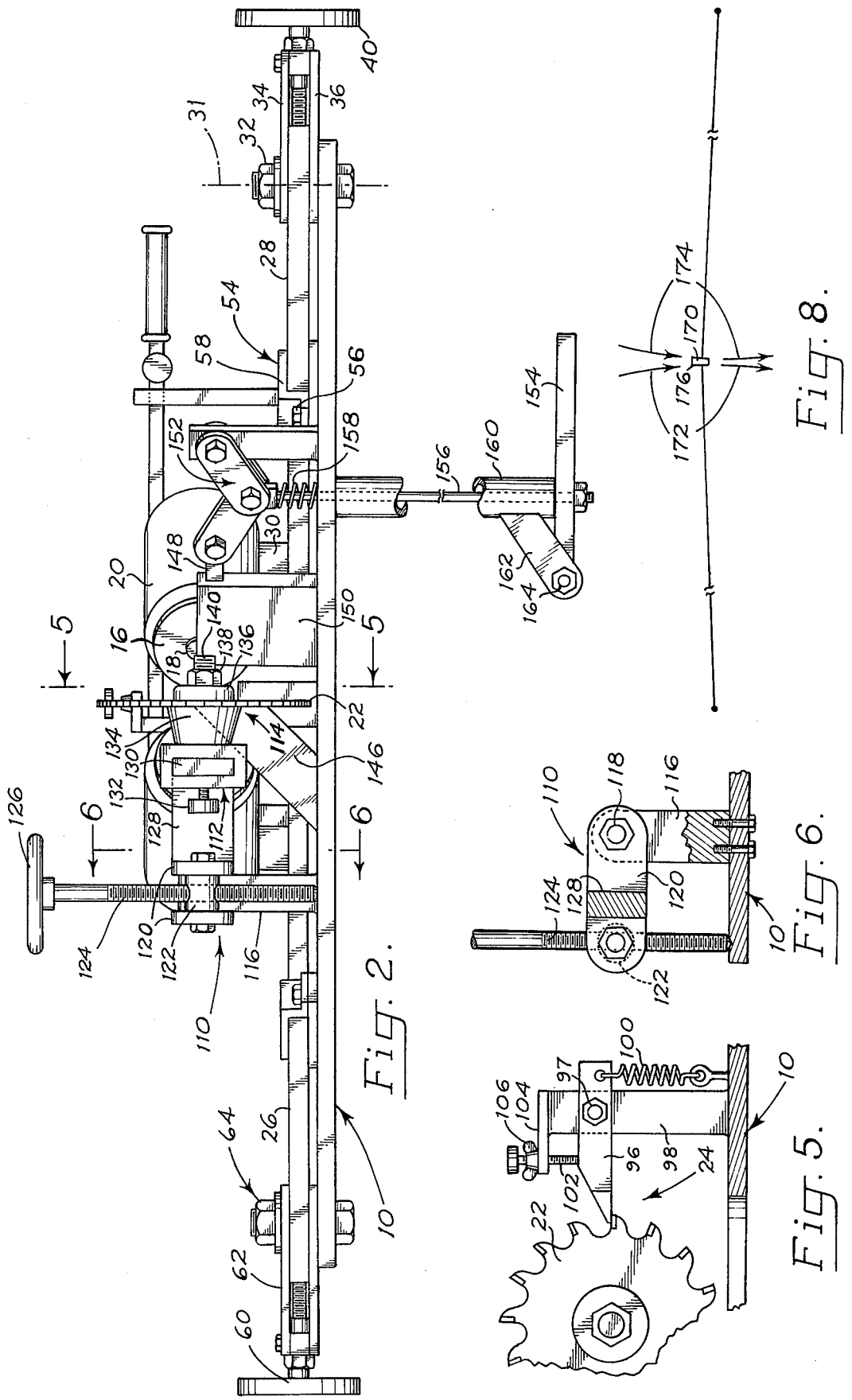

GRINDING MACHINE

This invention relates to grinding machines, and more particularly to a grinding machine adapted for use in the grinding of the teeth in a saw.

Various types of grinders or grinding machines have been proposed in the past for sharpening the teeth of saws. Many have been prohibitively expensive for small and medium-sized saw shop operators. The less expensive grinding machines usually fail to produce precision work, and production from the machines is limited. Another disadvantage of many machines is a construction that limits the size and types of saws that may be sharpened, and makes it difficult to set up the machine for a given type of saw even where such falls within the size and type that the machine is designed for handling.

A particular problem characterizing most grinders known to date is a difficulty in the obtaining in saws having carbide or other types of insert tips a truly sharp cutting edge along opposite outer edges of the tip, and to obtain exact uniformity in the side-to-side dimension in the respective tips that make up the plurality found in a conventional saw with multiple teeth. I have observed that this is apparently due to the inherent give which is always present in the mounting of a grinding wheel on a power-driven grinding wheel arbor, which enables a grinding wheel on initially contacting a tip to back off slightly on progressing over the remainder of the surface of the tip being ground, this resulting in a slightly rounded edge imparted to the tip where the grinding wheel first contacts the tip and starts to grind the same. As a consequence, even with the most careful attention to detail, imperfect results are often obtained in the sharpening operation.

A general object of this invention is to provide a unique grinder or grinding machine for saws which is a precision machine designed for maximum production, and which can be produced and sold at a fraction of the cost typifying known grinding machines of similar capabilities.

Another object is to provide a grinding machine which is extremely versatile in operation and, with relatively easily made adjustments, can be set up to handle a wide variety of saw sizes and types. In this connection, it should be remembered that saws even of the same diameter will vary in detail, such as the radial and tangential clearance provided in the tips, the hook of a tooth, the thickness of the blade in the saw, tooth pitch, etc.

A specific and important feature and advantage of the invention is the provision in a grinder of means whereby a grinding wheel moves into and against a tip in such a manner as to produce a truly sharpened edge in the tip without the rounding effect above discussed, with this being reproduced consistently in the respective teeth making up a saw.

The grinding machine contemplated is easy to operate and simple to maintain.

These and other objects and advantages are attained by the invention, which is described hereinbelow in conjunction with the accompanying drawings, wherein:

FIG. 1 is a top plan view of a machine constructed according to an embodiment of the invention;

FIG. 2 is a front elevation of the machine illustrated in FIG. 1;

FIG. 3 is a cross-sectional view, taken generally along the line 3—3 in FIG. 1;

FIG. 4 is a cross-sectional view, taken along line 4—4 in FIG. 1;

FIG. 5 is a cross-sectional view, taken generally along the line 5—5 in FIG. 2, and illustrating an indexing means in the grinding machines;

FIG. 6 is a cross-sectional view taken generally along line 6—6 in FIG. 2, showing details of portions of the structure for mounting a saw to be sharpened in the apparatus;

FIG. 7 is a view taken along the line 7—7 in FIG. 4; and

FIG. 8 is a diagrammatic drawing illustrating how grinding may be performed with the machine disclosed.

Referring now to the drawings, and more particularly to FIG. 1, 10 indicates what is referred to as a base plate in the machine which ordinarily is supported on suitable framework, not shown, at a convenient working level above the floor. The grinding machine illustrated, which is a dual side grinder, includes a pair of power-driven grinding wheel means supported above the base plate, one being indicated at 12 and the other being indicated at 14. Each grinding wheel means includes a grinding wheel 16, mounted on a grinding wheel arbor 18 driven by a motor 20. The dual side grinder shown is adapted for the grinding of opposite sides or faces of the carbide tips in a circular saw, exemplified by the saw given the reference numeral 22 in the drawings. The tips in the saw are ground one at a time. Grinding is performed on one tooth at a time, more specifically the tip in such tooth with such tooth occupying a grinding station indicated at 24. The grinding wheels of means 12 and 14 are in opposed relation and on opposite sides of a tooth in this grinding station.

In each grinding wheel means, the arbor 18 which supports the grinding wheel has an axis which extends at a slight angle with respect to the plane of the saw being ground. This positions the grinding wheel whereby its edge is adapted to grind the side face of a tip in a saw tooth, on such edge being moved across such side face.

Each grinding wheel means is mounted on an elongate arm or member which supports the housing of the motor in the wheel means, exemplified in the case of wheel means 12 by arm 26, and in the case of wheel means 14 by arm 28.

With the mounting for the two grinding wheel means being similar, only one will be described in detail. Thus, and considering wheel means 14, the housing of motor 20 in the wheel means is secured through suitable fasteners and a pad 30 (see FIG. 2) to one end of arm 28. THe other end, which is the right end in FIGS. 1 and 2, is pivotally mounted on base plate 10 for pivotal movement about axis 31 of fastener assembly 32, i.e. a vertical axis with arm 28 swinging in a horizontal plane spaced above base plate 10.

Means is provided for varying the effective radius about which the grinding wheel means swings on pivotal movement of the arm supporting it, and adjustment in this radius changes the distance or spacing between the pivot axis for the arm (which is axis 31) and that part of the edge of the grinding wheel 16 which engages a tooth, more particularly a tip, in the grinding station. Considering details of this adjustment means, and referring to FIGS. 1 and 4, adjacent the right end of arm 28 is a clevis assembly comprising top and bottom plates 34, 36 secured together at one set of ends through a block 38. Plates 34 and 36 straddle the end of arm 28. Journaled in block 38 is an assembly comprising hand wheel 40 and lead screw 42. The end of arm 28 has a threaded bore 44 receiving the end of lead screw 42.

Fastener assembly 32 includes shank portion 46 extending through a slot 48 in arm 28 oriented with the longitudinal axis of the slot aligned with the axis of lead screw 42. From this it should be obvious that with turning of the hand wheel, the arm may be advanced or retracted within the confines of slot 48 to produce the radius change above briefly referred to.

As best illustrated in FIG. 7, base plate 10 has a slot 50 receiving reduced portion 52 of the fastener assembly 32. The axis of this slot is normal to the axis of slot 48 in arm 28. Loosening of the nut in fastener assembly 32 permits the fastener assembly and the pivot axis afforded thereby to be adjusted in a direction which is normal to the axis of slot 48 and which parallels the plane of the saw blade mounted in the machine.

A bracket 54 secured by fasteners 56 to base plate 10 has a raised central portion 58 passing over the top of arm 28. This bracket limits the pivotal movement afforded the arm.

A similar construction including hand wheel 60, clevis assembly 62 and fastener assembly 64 pivotally mounts the left end of arm 26 mounting grinding wheel means 12.

In the grinding off of opposite sides or faces of a tip in a saw tooth, the two grinding wheels in wheel means 12 and 14 are moved with pivotal movement of arms 26, 28 in a slightly concave arcuate sweeps across opposite sides of the tooth being sharpened. The grinding machine includes a hand actuator for producing such pivotal movement of the two arms in unison, whereby opposite sides of the tooth, more specifically the tip, are ground at the same time.

More specifically and referring to FIGS. 1 and 3, adjacent the rear of the machine and extending upwardly from base plate 10 are a pair of posts 70, 72. These are suitably secured as by screws 74 to the base plate. An elongate feed handle 76 joined to a riser 78 is pivotally mounted by fastener 80 to the upper end of post 70. A secondary feed arm 82 underneath the feed handle is pivotally secured by fastener 84 to the upper end of post 72. The feed arm and feed handle are pivotally interconnected at a location approximately midway between posts 70, 72 by pin 86 having a threaded end screwed into the feed arm. As best seen in FIG. 3, the upper part of the pin extends through a slot 88 in the feed handle, the axis of such slot being aligned with the axis of handle 76.

The free or nonpivoted end of secondary feed arm 82 is secured through an adjustable link assembly 90 to the housing of drive motor 20 of grinding wheel means 12. Another link assembly 92 secures the feed handle to the housing of motor 20 in grinding wheel means 14.

When the feed handle 76 is swung upwardly in FIG. 1, it should be obvious that this is effective to move toward parallelism the feed handle and the secondary feed arm 82, this producing upward pivotal movement of arms 26, 28 in FIG. 1 with the grinding wheels and the wheel means moving away from the saw and apart from each other. Conversely, downward movement of the handle produces pivotal movement of the arms 26, 28 with the free ends of these arms converging upon each other, and the grinding wheels moving radially inwardly on the saw and toward each other.

Referring now to FIGS. 1 and 5, the tooth of a saw which is to be ground is indexed in the grinding station through an indexing finger 96. Such finger is pivotally supported at 97 on the upper extremity of a post 98 secured to the base plate 10 in the machine. Coil spring 100 interposed between the right end of finger 96 and the base plate in FIG. 5 biases this right end downwardly to urge the left end upwardly against a stop screw 102. The stop screw is suitably threadably received within an accommodating threaded bore passing through a shelf 104 joined to the top of post 98. Wing nut 106 is used firmly to tighten the stop screw in any given adjusted position.

A saw which is to be ground is mounted in the grinder by means including an adjustable rock arm 110, an adjustable slide 112 and a rotatable saw holding means 114.

More specifically, and referring to FIGS. 2 and 6, suitable secured to the base plate 10 and extending upwardly therefrom is a post 116. Pivotally secured by a fastener 118 to an upper extremity of this post are a pair of plates 120 making up rock arm 110.

Journaled between ends of plates 120 remote from fastener 118 is a member 122 having a threaded bore extending diametrically thereof. A screw 124 having its bottom end resting on base plate 10 and provided at its upper end with a hand wheel 126 is threadably received within this bore. Turning of the screw with the hand wheel is effective to raise or lower the nonpivoted end of rock arm 110.

Secured to the rock arm through piece 128 is an elongate arm 130 (see FIGS. 1 and 2) which extend outwardly toward the front of the machine and which generally parallels the plane of a saw mounted in the machine. Slide 112 earlier described is slidably mounted on this arm for movement along a lineal path defined by the arm. Turn screw 132 is employed to secure the slide in any given adjusted position on the arm.

Holding means 114 includes a truncated cone element 134, and washer, nut and screw 136, 138, 140. The same is effective to hold a saw with the plane thereof passing through the grinding station and normal to base plate 10, with the saw being freely rotatable about the axis of screw 140. The holding means is mounted on the upper end of the slide as such is illustrated in FIG. 1.

The pivot axis afforded by fastener 118 for the rock arm passes approximately through the grinding station in the apparatus. Furthermore, the axis of the path of movement provided by arm 130 intersects this pivot axis. The slide constitutes an adjustable support means accommodating shifting of the axis of the saw supported thereby laterally or in a direction extending normal to the axis of the saw. The rock arm which mounts the slide and arm 130 accommodates adjustment in the orientation of the path along which the slide moves, more specifically, the angle of the arm with respect to horizontal.

Saws differ in construction. The saw illustrated in FIG. 5, for instance, has substantially a zero hook angle, with the plane of the front face of the tip passing essentially through the center of the axis of the saw. In a saw having what is known as a positive hook angle, this plane of the tip would pass below the center axis of the saw in FIG. 5, and with a negative hook angle would pass above it. The rock arm described permits the axis of a saw mounted in the machine to be moved upwardly or downwardly to the extent required whereby the plane of the face of the tip will be substantially horizontal when occupying the grinding station regardless of the hook angle present in the particular saw being sharpened. The slide or adjustable support means described adapts the machine for handling saws of different radii.

With the saw in the grinder and a tooth properly positioned by the indexing finger, the blade is firmly clamped in place in a stationary position by clamp mechanism shown at 144 in FIG. 1. Such includes an upstanding bar 146 secured to the base plate and with a vertical flat face which supports the left side of the saw in FIGS. 1 and 2. The opposite side of the saw is engaged by a clamp rod 148 slidably mounted in a guide block 150 secured to the base plate. To retract the clamp rod, to move its end away from the face of a saw blade, toggle link mechanism 152 is actuated by depressing foot lever 154 (see FIG. 2) to pull down on rod 156 connected to the toggle link mechanism. Biasing the toggle link mechanism upwardly is a coil compression spring 158 interposed between base plate 10 and the toggle link mechanism. A sleeve 160 secured to the base of the base plate and encircling rod 156 includes a lug 162 secured thereto which pivotally mounts at 164 the foot pedal.

To mount a saw in place, the foot pedal is depressed to back away clamp jaw 148, and the saw is then mounted against truncated cone element 134 with subsequent reassembly of the washer and nut. Slide 112 is released and moved on arm 130 to adjust for the radius of the saw, proper adjustment being indicated when a tip on a saw tooth extends slightly past the end of the tip of index finger 96. The slide is then secured in place and rock arm 110 adjusted to place the front face of the tip in the saw parallel to the bottom of the index finger. On release of foot pedal 154, clamp jaw 148 returns to clamp the saw in place.

To sharpen a tip so positioned, the feed handle is drawn toward the forward part of the machine. This serves to pivot arms 26, 28 forwardly, with the grinding wheels moving past opposite side faces of the tip being ground. After the feed handle has engaged feed stop 165 (see FIG. 1), the feed handle is returned by pushing it to the rear of the machine, the grinding wheels then moving back over the ground faces of the tip to polish them.

As grinding wheels wear, or to accommodate a different width of tip, hand wheels 40, 60 are rotated to extend or contract the effective length of arms 26, 28.

After one tooth is ground, clamp jaw 148 is retracted and the saw rotated by hand to move another tooth past the index finger. The saw is then backed into place to bring the next tip up against index finger whereby it now occupies the position formerly occupied by the tip just ground. The clamp jaw is then returned and the sharpening or grinding process repeated.

The grinding machine permits adjustments to be made to change the radial clearance ground in a tooth, as well as the so-called tangential clearance.

Further explaining, a tooth with a zero radial clearance has opposed side faces which are parallel and parallel to the plane of the saw. A tooth with, for example, 3° radial clearance has side faces that are inclined 3° from a plane paralleling the plane of the saw, the incline being such that the planes of the faces converge on each other progressing radially inwardly on the saw. Adjustment in radial clearance is effected by loosening fastener assembly 32 for an arm and changing the position of the fastener where such is secured to the base plate 10 within the confines of slot 50. Referring to FIG. 1, with the location of the fastener assembly 32 moved upwardly in the figure, radial clearance is decreased, and conversely, with the location moved downwardly, radial clearance is increased.

The tangential clearance in a tip refers to the extent that the side faces of the tip converge on each other progressing circumferentially on the saw rearwardly from the front face of the tip, zero tangential clearance again referring to the fact that in this circumferential direction the side faces are parallel. Referring to FIG. 5, if index finger 96 is adjusted vertically in FIG. 5 to raise or lower its left end, and a saw is positioned, again, with its tip lying flat against the under side of the indexing finger, this changes the position of the grinding station in the machine slightly, wherein portions of the grinding station in the machine slightly, wherein portions of the opposed grinding wheels in a zone shifted vertically from the previous setting are effective to produce grinding of the tip. With the grinding wheels being circular, this has the effect of changing the tangential clearance produced during the grind.

FIG. 8 illustrates schematically a unique characteristic of the grinding machine obtained by reason of the use of pivoting arms or members 26, 28 for mounting the grinding wheel means 12 and 14. In FIG. 8, a tip 170 is shown as such would appear with the tip properly located in the grinding station and looking downwardly on the top of the machine as shown in FIG. 1. In FIG. 8, the arcuate arrows 172, 174 describe the path of the grinding portions of the grinding wheels as such are moved inwardly and toward each other with pivotal movement of arms 26, 28. It will be noted that, with respect to a grinding wheel following arrows 172, after such initially engages the tip at zone 176 and on continued movement, the wheel moves in a slightly concave inwardly directed sweep over the remainder of the face of the tip. This produces a sharp edge extending along zone 176 even with slight play in the parts, such as would cause the grinding wheel to be pushed outwardly slightly on meeting the stiff resistance of the carbide tip. As a consequence, the grinding machine can produce truly sharp edges along opposite sides of the tip where side faces meet with outer portions of the tip, with obviating of the problem of a tendency to produce round edges in these regions as has characterized known types of grinders.

It should be obvious from the above description that the grinder has additional features and advantages which distinguish it from grinding machines known to date. Adjustments are easily made to take care of wear of the grinding wheels, different widths of teeth, different radiuses of saws and different hook angles, as well as to provide the tangential and radial clearance desired. The machine is a truly versatile machine which can handle a wide range of saw types and sizes. The machine is a dual side grinder in that opposite sides or faces are ground at the same time. While producing a precision grind which is reproduceable consistently, the machine nevertheless is relatively simply constructed and easily maintained. The grinding is rapidly performed with production in the machine being equivalent with the production obtained in known machines of far greater initial capacity cost.

It is claimed and desired to secure by Letters Patent:

1. In a saw tooth grinding machine, means for mounting a saw with a tooth of the saw occupying a grinding station in the machine, first and second power-driven grinding wheel means, each including a grinding wheel, and a mounting for each grinding wheel means, said mountings supporting said grinding wheel means with the grinding wheels thereof disposed in opposed relation on opposite sides of a tooth in said grinding station, the mounting for each of said grinding wheel means including means for producing movement of the grinding wheel thereof with that part of the grinding wheel which engages a tooth occupying the grinding station moving in a curved sweep across the side of the tooth which sweep moves toward the tip of the tooth and thence toward the base of the tooth while converging on the side of the tooth.

2. The grinding machine of claim 1, wherein the mounting for a grinding wheel means comprises a pivoted member mounted for pivotal movement about an axis spaced laterally of the plane of a saw having the tooth occupying said grinding station and substantially paralleling said plane, that part of the grinding wheel which engages a tooth in said station being located at a point spaced from said axis so as to move in an arcuate sweep about said axis with pivotal movement of the pivoted member.

3. The grinding machine of claim 2, wherein the grinding wheel means includes an arbor for supporting its grinding wheel which positions the grinding wheel for edge grinding of the side of a tooth in said station.

4. The grinding machine of claim 2, which includes means for adjusting the spacing between said pivot axis and that part of the grinding wheel which engages a tooth in said station.

5. The grinding machine of claim 1, wherein the mounting of each grinding wheel means comprises a pivoted member mounted for pivotal movement about an axis spaced laterally of the plane of the saw having the tooth occupying said grinding station, and means is provided for pivoting the pivoted members in the mountings of the first and second grinding wheel means in unison.

6. The grinding machine of claim 2, wherein the means for mounting the saw comprises means for holding a circular saw at the eye region of the saw, said holding means being adjustably positionable to shift the axis of a saw held thereby in a direction extending normal to said saw axis.

7. The grinding machine of claim 1, wherein the mounting of each grinding wheel means comprises a pivoted member mounted for pivotal movement about an axis spaced laterally of the plane of a saw having the tooth occupying said grinding station, that part of the grinding wheel in said grinding wheel means which engages a tooth in such station being located at a point spaced from the pivot axis for the pivoted member of said grinding wheel means so as to move in an arcuate sweep about said pivot axis with pivotal movement of the pivoted member, the mounting of each grinding wheel means further including means for adjusting the spacing between the pivot axis for the pivoted member therein and that part of the grinding wheel thereof which engages a tooth in said station, and wherein the means mounting the saw comprises means for holding a circular saw at the eye region of the saw, said means for holding the saw being adjustably positionable to shift the axis of the saw held thereby in a direction extending normal to the axis of the saw.

8. In a grinding machine for grinding the teeth in a circular saw, holding means for holding the saw at the eye region thereof with the saw rotatable about its axis, an index finger spaced radially from the axis of a saw so held adapted to have a tooth of the saw rest there against thus to position the saw tooth for grinding, clamp mechanism for clamping a saw having a tooth thereof so positioned, first and second grinding wheel means, each including a grinding wheel, and a mounting for each grinding wheel means, said mountings supporting the said grinding wheel means with the grinding wheels thereof disposed in opposed relation on opposite sides of a tooth so positioned, said grinding wheels being positioned to edge grind opposite sides of the tooth and said mountings for said grinding wheel means including means for producing movement of their grinding wheels simultaneously across opposite side faces of the tooth with each grinding wheel moving in a defined path extending toward the axis of the saw and converging on the plane of the saw.

9. The grinding machine of claim 8, wherein the means for holding the saw is mounted on an adjustable support means accommodating adjustable shifting of the axis of a saw held by the holding means in a direction normal to the axis of the saw.

10. The grinding machine of claim 9, wherein said adjustable support means includes a slide mechanism acommodating shifting of the holding means in a substantially lineal path, and means mounting said slide mechanism accommodating shifting of the orientation of said path with respect to said finger.

11. The grinding machine of claim 8 wherein the mounting for a grinding wheel means comprises a pivoted member mounted for pivotal movement about an axis spaced laterally of the plane of the saw, that part of the grinding wheel which engages a tooth in the saw being located at a point spaced from said pivot axis so as to move in a arcuate sweep about the pivot axis with pivotal movement of the pivoted member.

12. In a saw tooth grinding machine, means for mounting a saw with a tooth of the saw occupying a grinding station in the machine, a power-driven grinding wheel means including a grinding wheel and a mounting for said grinding wheel means supporting the grinding wheel means with the grinding wheel thereof adjacent a side of a tooth in said grinding station, the mounting for the grinding wheel means including means for producing movement of the grinding wheel thereof with that part of the grinding wheel which engages a tooth occupying the grinding station moving in a curved sweep across the side of the tooth which sweep moves toward the tip of the tooth and then towards the base of the tooth while converging on the side of the tooth.

* * * * *